H. S. BALDWIN.
MOTOR VEHICLE.
APPLICATION FILED JUNE 22, 1899. RENEWED JAN. 27, 1911.
992,472.
Patented May 16, 1911.
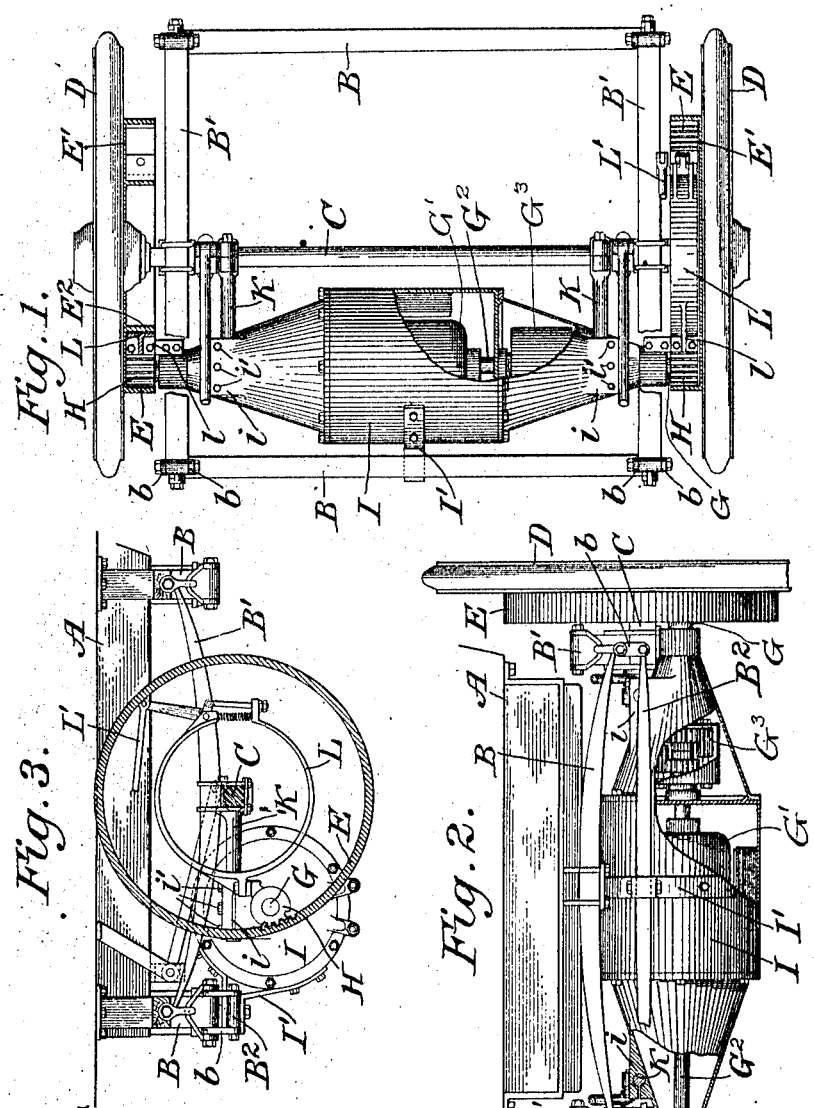
Attest:
A. N. Jesbera.
L. R. Moore.
Inventor:
Henry S. Baldwin
by Redding, Kiddle & Greeley
Attys

UNITED STATES PATENT OFFICE.

HENRY S. BALDWIN, OF HARTFORD, CONNECTICUT, ASSIGNOR, BY MESNE ASSIGNMENTS, TO THE COLUMBIA MOTOR CAR COMPANY, OF HARTFORD, CONNECTICUT, A CORPORATION OF CONNECTICUT.

MOTOR-VEHICLE.

992,472.  Specification of Letters Patent.  Patented May 16, 1911.

Application filed June 22, 1899, Serial No. 721,504. Renewed January 27, 1911. Serial No. 605,073.

*To all whom it may concern:*

Be it known that I, HENRY S. BALDWIN, a citizen of the United States, residing in Hartford, county of Hartford, State of Connecticut, have invented certain new and useful Improvements in Motor-Vehicles, of which the following is a specification, reference being had to the accompanying drawing, forming a part hereof.

This invention relates particularly to the driving trucks of motor vehicles, that is to say, those portions of the running gears of motor vehicles which include or embody the driving mechanism and support the driving wheels.

The invention is particularly concerned with the means for supporting the driving mechanism including also the spring system in its relation to the support of the driving mechanism, and with the brake in its relation to the other parts of the driving truck.

The object in view in this portion of the invention which is first referred to is to hold the motor shaft or driving pinions rigidly in alinement with the gears on the driven shaft or wheels, to facilitate the attachment and removal of the driving mechanism as a whole and to improve the support of the driving mechanism in such a way as to diminish the shock in starting while affording a proper support during operation, and the object in view in the last mentioned part of the invention is likewise to provide for the support of the brake so as to diminish the shock when the brake is first applied and also to facilitate manufacture and simplify construction.

The invention will be more fully described hereinafter with reference to the accompanying drawing, in which, for purposes of explanation, it is illustrated as embodied in a convenient and practical structure.

In the drawing, Figure 1 is a plan view of a driving truck which embodies the invention, the side springs being partly broken out to show parts beneath and the brake drum, brake band and driving gear on one of the wheels being shown in section, while the driving gear alone on the other wheel is shown in section with the brake band in plan view. Fig. 2 is a front elevation of the same with one of the driving wheels and its brake drum and driving gear removed, the vehicle body being indicated. Fig. 3 is a view in side elevation of some of the parts shown in Figs. 1 and 2, with the vehicle wheels omitted and one of the driving gears partly shown in section.

In the structure chosen for illustration in the drawing the body A of the vehicle has secured thereto the transverse springs B to the free ends of which are connected in usual manner the side springs B'. The axle C, in this instance a fixed or nonrevoluble axle, is secured to the side springs B' and has the driving wheels D of the vehicle mounted to rotate thereon, the springs B and B' and the axle C constituting a truck or truck frame for the driving wheels and for supporting the motor and driving mechanism, as will appear hereinafter. The driven gears E may be secured directly to the respective driving wheels and are conveniently formed as gear rims on a gear plate E'. For the proper action of the brake it is desirable that the brake-drum should be concentric with the wheel or other part to which it is applied and to attain this result in a convenient manner it may be formed as a rim $E^2$ integral with the gear plate E' and the gear or gear rim E and in same plane with said rim. This construction insures the concentricity of the brake drum and the gear and permits these two parts to be secured together and by the same means to the driving wheel of the vehicle so that concentrically mounting one insures concentricity of the other.

The driving mechanism of itself forms no part of the present invention, and is sufficiently represented for the purposes of this specification by the motor G', the driving or motor shaft $G^2$, transmitting mechanism such as differential gearing $G^3$, and the driving pinions H, which mesh with the driving gears E, one of which pinions is carried by the driven shaft G, and the other of which pinions is carried by the motor shaft G², said driving mechanism being supported by, and, with the exception of the pinions H, inclosed by, a casing or truss frame I. The latter need not be described herein except to say that it has its maximum section in its middle portion while its ends directly support the shaft sections G of the driving mechanism in close proximity to the driving pinions H, thus not only inclosing but rigidly supporting the driving mechanism and possessing the maximum of strength for a given weight of material.

The casing is supported at or near its ends and in order that it may be supported rigidly so that the alinement of the driving mechanism and particularly of the driving pinions H with relation to the driven gears E shall be maintained, while at the same time it may be removed readily when necessary, it is provided near its ends with transverse sockets $i$ with bearing surface of considerable length not only affording ample resistance against the tendency to twist the torpedo on its axis, which is relatively little, or the tendency of the torpedo axis to twist out of parallelism to the rear axle, but more particularly to resist the bending or breaking stress due to the weight of the torpedo and its vertical displacement between two supports, namely, the rear axle and suspender bar. These sockets are preferably made integral with the casing itself, which is desirable for the reason that the casings, to be light, are comparatively thin for the strains due to the support attachment, and consequently it is desirable that the sockets be of considerable length, thereby enabling them to be attached to a considerable extent of casing surface. Arms K, which are secured rigidly to the axle C, enter these sockets $i$, being secured thereto, it may be, by clamping bolts $i'$, and by their long bearing in the sockets serve to hold the casing, and the parts carried by it, absolutely in fixed relation to the axle C, thereby maintaining the driving gear pinions H in absolute alinement and preventing imperfect meshing or twisting of the pinions with respect to the driven gears E. The meshing of the pinions and gears obviously is not affected by any movement of the casing with its contained driving mechanism about the axle C as a center and in fact a yielding movement of this character is desirable as preventing shocks upon the intermeshing gears in starting the vehicle, particularly when an electric motor is employed as a part of the driving mechanism contained within the casing. The casing may therefore be provided with an additional means of support which will permit such yielding movement, such means comprising an arm I' secured to the casing and a practically straight transverse spring suspender bar B² upon which said arm I' rests or to which it is secured, said bar B² being suspended from the spring bar B above it by suitable links $b$, such bar B² thereby forming a part of the spring system of the driving truck.

It will be noticed that reliance is not placed upon a full elliptical spring alone, with a single point (or points) of attachment to the vehicle, to resist the twisting action on or at the axle, as such would give excessive strains at that point of attachment to the body, and could not be made satisfactorily to resist the strains in the driving truck of a motor vehicle; but on the contrary a transverse bar is connected at its ends to the side springs B' and is attached to the body a considerable distance from the center of twisting due to the torque on the driving wheels, and this torque is practically carried by the suspender bar and transmitted to the transverse spring and through it to the body, and is not actually transmitted to the whole spring system with a tendency to unduly twist the longitudinal springs, especially at the points of attachment of the axle and to the body, although, through the connection of the several parts, a small fraction of this torque may be considered to be transmitted to the spring system. By these connections a large portion of any strain, weight or jar on the torpedo casing is absorbed by the bar B², and by the attachment of the bar B² to the ends of B the rest of any strain weight, etc. is further diminished by absorption of part in spring B, giving the least possible final strain at the attachment to the body. In this way spring B alone of the spring system supporting the body performs the double function of body spring system and flexible motor suspension.

It will be obvious that various changes in details of construction and arrangement may be made to suit different conditions of use and that the invention therefore is not restricted to the particular construction and arrangement shown.

If the brake-band of a vehicle of this description is anchored to a rigid and unyielding support the shock produced when the brake is applied suddenly is considerable, and it is well to avoid it. Accordingly, in the present case, the brake-band L, which embraces the brake-drum E², and is operated by any suitable means, as by the lever and link represented at L', is anchored to a rotarily yielding part. In this instance it is shown as anchored, as at $l$, to the end of the casing I, which, as already described, is free to yield rotarily to a limited extent about the axis of the driving gears and therefore of the brake-drums as a center, and which practically forms a part of the yielding framework of the truck.

The mode of operation and advantages of the several features of the invention will be clearly understood from the foregoing description of the construction and require no further explanation herein.

I claim as my invention,—

1. In a motor vehicle, the combination with the driving wheels, driven gears and frame of the driving truck, of a casing inclosing and supporting the driving mechanism and the driving pinions in mesh with said driven gears, said casing being provided near its ends with transverse sockets affording a relatively long bearing surface, and arms entering said sockets and secured to said frame, substantially as shown and described.

2. In a motor vehicle, the combination with the driving wheels, driven gears and frame of the driving truck, of a casing inclosing and supporting the driving mechanism and the driving pinions in mesh with said driven gears, said casing being formed near its ends with integral transverse sockets affording a relatively long bearing surface, and arms entering said sockets and secured to said frame, substantially as shown and described.

3. In a motor vehicle, the combination with the driving wheels, driven gears and frame of the driving truck, of driving mechanism having shafting and driving pinions in mesh with said driven gears, a casing inclosing and supporting the driving mechanism and supporting the shafting in proximity to said driving pinions, said casing being provided near its ends and in proximity to said pinions with transverse sockets affording a relatively long bearing surface, and arms entering said sockets and secured to said frame, substantially as shown and described.

4. In a motor vehicle, the combination with the driving wheels, driven gears and spring system of the driving truck, of a casing inclosing and supporting the driving mechanism and supporting the driving pinions in mesh with said driven gears, means to support said casing at its ends, and a bar suspended from said spring system and also supporting said casing, substantially as shown and described.

5. In a motor vehicle, the combination with the driving wheels, driven gears and a transverse spring, of a casing inclosing and supporting the driving mechanism and supporting the driving pinions in mesh with said driven gears, means to support said casing at its ends, and a suspender bar suspended from said transverse spring and also supporting said casing, substantially as shown and described.

6. In a motor vehicle, the combination with the body, driving wheels, driven gears and a transverse spring secured at its middle to the body, of a casing inclosing and supporting the driving mechanism and supporting the driving pinions in mesh with said driven gears, means to support said casing at its ends, and a suspender bar supported at its ends from the ends of said transverse spring and at its middle supporting said casing, substantially as shown and described.

7. In a motor vehicle the combination with the driving wheels, driven gears, driving mechanism including a motor, gearing and shafting, of a casing extending from the driven gears on one side to the driven gear on the other side and inclosing and supporting the motor, gearing and shafting, and the driving pinions in mesh with said driven gears, said casing having its middle portion of maximum section to accommodate the motor and gearing and its end portions reduced and provided with bearings to support the shafting near its outer ends in proximity to said driven gears, and being rigidly supported near its ends, substantially as shown and described.

8. In a motor vehicle, the combination with the driving wheels, and driven gears, of a casing inclosing and supporting the driving mechanism and supporting the driving pinions in mesh with said driven gears, means to support said casing at its ends, and a transverse bar suspended above said casing and also supporting the same at its middle portion, substantially as shown and described.

9. In a motor vehicle, the combination with the driving wheels, driven gears and a transverse spring, of a casing inclosing and supporting the driving mechanism and supporting the driving pinions in mesh with said driven gears, means to support said casing from the axle of the vehicle, and a suspender bar suspended from said transverse spring and also supporting said casing, substantially as shown and described.

10. In a motor vehicle, the combination with driving wheels, an axle therefor, and driving mechanism including a driving shaft and differential gearing, of a casing inclosing said driving mechanism, said casing being supported at two points on the axle and also at a third point on said casing, which point is central with respect to the first two points of support and relatively distant from said axle, substantially as shown and described.

11. In a motor vehicle, the combination with driving wheels, an axle therefor, and driving mechanism including a driving shaft and differential gearing, of a casing inclosing said driving mechanism, driving pinions secured to the driving shaft, and three supports for said casing, two of the supports being attached to said casing near the driving pinions respectively and the third support attached to said casing at one side of the middle thereof, substantially as shown and described.

12. In a motor vehicle, the combination with driving wheels, an axle therefor, and driving mechanism including a driving shaft and differential gearing, of a casing inclosing said driving mechanism, and driving pinions secured to either end of said driving shaft, a support for said casing at each end of the same and a third support for said casing at a point on said casing, which point is at one side of the middle of said casing, substantially as shown and described.

13. In a motor vehicle, the combination with the driving wheel, axle and truck-frame, of driving mechanism including a driving shaft and differential gearing, and a casing inclosing said driving mechanism, said casing being suspended from the truck frame at three points, substantially as shown and described.

14. In a motor vehicle, the combination with a driving wheel, a driven gear and a transverse spring, of a casing inclosing and supporting the motor and its parts and supporting the driving pinion in mesh with said driven gear, means to support said casing at its ends and a suspender member suspended from said transverse spring and also supporting said casing, substantially as shown and described.

15. In a motor vehicle, the combination with running gear including a non-revoluble axle, of a driving shaft, a driven shaft and transmitting mechanism interposed between said driving shaft and driven shaft, a shell or casing inclosing said mechanism and three supports for said mechanism connected with the motor truck, substantially as shown and described.

16. In a motor vehicle, the combination with running gear including a non-revoluble axle, of a driving shaft, a driven shaft and transmitting mechanism interposed between said driving shaft and driven shaft, a shell or casing inclosing said mechanism, and supports K, K, I' for said mechanism, said supports being suspended from the motor truck, substantially as shown and described.

17. In a motor vehicle, the combination with running gear including a non-revoluble axle, of a motor and its shaft, a second shaft and transmission mechanism between the motor shaft and said second shaft, both of said shafts and transmission mechanism being supported by a common casing suspended at three points.

18. In a motor vehicle, the combination with running gear including a non-revoluble axle and a longitudinal spring attached transversely to said axle, of a driving shaft, a driven shaft projecting laterally beyond the running gear spring, transmitting mechanism interposed between said driving shaft and driven shaft, a shell or casing supporting the transmitting mechanism and shafts, and three supports for said casing.

19. In a motor vehicle, the combination with a motor and its shaft, a second shaft, transmission mechanism between the motor shaft and the second shaft, side springs, a non-revoluble axle to which said side springs are fastened near either end, a wheel on the end of said axle beyond the corresponding side spring, and a gear upon the wheel, of a casing supporting the motor, shafts and transmission mechanism, and a pinion on the end of said second shaft in mesh with said gear.

20. In a motor vehicle, a motor, driving wheels, a driving shaft, differential driving mechanism driven thereby and supported within a casing, driven connections from said differential mechanism to either end of said casing including shafts, said shafts projecting at the opposite ends of said casing respectively and connections from each driven shaft to a driving wheel, whereby said wheels may be respectively driven at differential speeds, means for support of said casing upon said vehicle.

21. In a motor vehicle, the combination with the driving mechanism of a casing extending transversely of said vehicle, yielding supports for said casing at the ends thereof respectively, a differential transmitting mechanism and its shell supported within said casing, driven shafts extending from said differential transmitting mechanism through either end of said casing, connections at the outer end of said driven shafts exterior to said casing for driving wheels on either side of said vehicle, a source of power on said vehicle and a driving shaft extending to said transmitting differential mechanism.

22. In a motor vehicle, the combination of a casing, two longitudinal spring members connected to the vehicle body, connections between the ends of the casing and said members whereby the casing is yieldingly supported with respect to the body, differential driving mechanism supported in said casing, shaft sections connected with said mechanism and also supported in said casing and projecting beyond the ends thereof respectively, and connections from each of said shaft sections to the driving wheels, whereby said wheels may be driven respectively at different speeds.

23. In a motor vehicle, the combination of a casing having a relatively large middle portion and reduced ends, two longitudinal spring members connected to the vehicle body, connections between the ends of the casing and said members whereby the casing is yieldingly supported with respect to the body, differential driving mechanism supported in said casing, shaft sections connected with said mechanism and also supported in said casing and projecting beyond the ends thereof respectively, and connections from each of said shaft sections to the driving wheels, whereby said wheels may be driven respectively at different speeds.

This specification signed and witnessed this twelfth day of June, A. D. 1899.

HENRY S. BALDWIN.

In the presence of—
HERMANN F. CUNTZ,
MAUD L. CLARK.